United States Patent [19]

Elchinger et al.

[11] Patent Number: 4,682,183

[45] Date of Patent: Jul. 21, 1987

[54] GUTTER FOR AN INK JET PRINTER

[75] Inventors: Gilbert M. Elchinger, Kernersville, N.C.; Edward C. Mutschler, Jr., Yardley, Pa.; Eugene Behun, Rochester, N.Y.

[73] Assignee: Xerox Corporation, Stamford, Conn.

[21] Appl. No.: 887,453

[22] Filed: Jul. 21, 1986

[51] Int. Cl.[4] .......... G01D 15/18

[52] U.S. Cl. .......... 346/75; 346/140 R

[58] Field of Search .......... 346/75, 140 A, 140 R

[56] References Cited

U.S. PATENT DOCUMENTS

| | | | |
|---|---|---|---|
| 3,946,405 | 3/1976 | Berry et al. | 346/140 R |
| 4,255,754 | 3/1981 | Crean et al. | 346/75 |
| 4,309,711 | 1/1982 | Teumer | 346/75 |
| 4,347,521 | 8/1982 | Teumer | 346/75 |
| 4,442,440 | 4/1984 | Elchinger | 346/1.1 |
| 4,460,903 | 7/1984 | Guenther et al. | 346/75 |
| 4,525,721 | 6/1985 | Crean | 346/1.1 |

OTHER PUBLICATIONS

Lonis, "Startup and Shutdown Guttering System", Jul./Aug. 1984, Xerox Disclosure Journal, vol. 9, pp. 251-252.

*Primary Examiner*—E. A. Goldberg
*Assistant Examiner*—Gerald E. Preston
*Attorney, Agent, or Firm*—Robert A. Chittum

[57] ABSTRACT

An improved gutter assembly for a continuous multiple stream, pagewidth ink jet printer. The gutter assembly comprises a plurality of lineal segments mounted end-to-end to provide pagewidth guttering capability. Each segment is one integral structure. The gutter assembly is mounted adjacent the stitch sensors which are located a predetermined distance from the moving recording medium. Each integral gutter segment has a generally open concave shape. The integral gutter segment has a flat surface portion roughly parallel with the trajectories of the ink droplets and a flat sloping portion with an interconnecting arcuate portion. The flat surface portion of the gutter segment is below the droplet trajectories and approximately coplanar with the stitch sensors. A plurality of relatively narrow, droplet collecting entrances are formed in the flat surface portion of the gutter segment and project upwardly therefrom above the droplet flight paths. Each projecting gutter entrance is essentially perpendicular to the flight direction of the droplets and receives the droplets from two adjacent nozzles that are not to be printed. The gutter entrance has a sloping back wall which melds into the flat surface portion. The back wall at the entrance is wider than the opposite end portion that melds into the flat surface portion at the interface between the flat surface portion and the arcuate portion of the gutter segment. The sloping back wall of the gutter entrance is narrower at a location intermediate the droplet receiving opening of the gutter entrance and the opposite end portion thereof, so that in the plane view it appears as an hour glass shape. This hour glass shape prevents interference with the droplets from separate adjacent nozzles that are directed to the stitch point pixels on the recording medium.

10 Claims, 7 Drawing Figures

GUTTER FOR AN INK JET PRINTER

BACKGROUND OF THE INVENTION

1. Field of the Invention

This invention relates to ink jet printing, and more particularly to a gutter for collecting non-printed ink droplets from an ink droplet generator of a pagewidth, continuous stream type ink jet printer.

2. Description of the Prior Art

Ink jet devices of the continuous stream type generally employ a printhead having a droplet generator with multiple nozzles from which continuous streams of ink droplets are emitted and directed to a recording medium or a collecting gutter. The ink is stimulated prior to or during its exiting from the nozzles so that the stream breaks up into a series of uniform droplets at a fixed distance from the nozzles. As the droplets are formed, they are selectively charged by the application of a charging voltage by electrodes positioned adjacent the streams at the location where they break up into droplets. The droplets which are charged are deflected by an electric field either into a gutter for ink collection and reuse, or to a specific location on the recording medium, such as paper, which may be continuously transported at a relatively high speed across the paths of the droplets.

Printing information is transferred to the droplets through charging by the electrodes. The charging control voltages are applied to the charging electrodes at the same frequency as that which the droplets are generated. This permits each droplet to be individually charged so that it may be positioned at a distinct location different from all other droplets or sent to the gutter. Printing information cannot be transferred to the droplets properly unless each charging electrode is activated in phase with the droplet formation at the associated ink stream. As the droplets proceed in flight towards the recording medium, they are passed through an electric field which deflects each individually charged droplet in accordance with its charge magnitude to specific pixel locations on the recording medium. Thus, to calibrate the ink jet printer so that the ink droplets impact the desired locations on the recording medium, the trajectories of the ink droplets must be determined and adjusted in a manner, for example, taught by U.S. Pat. No. 4,255,754 to Crean et al. This patent discloses the use of paired photodetectors to sense ink droplets one each for two output fibers that are used to generate an electrical zero crossing signal. The zero crossing signal is used to indicate alignment or misalignment of a droplet relative to the bisector of a distance between the two output fibers. The sensor of this patent employs one input optical fiber and at least two output optical fibers. The free ends of the fibers are spaced a small distance from each other; the free end of the input fiber is on one side of the flight path of the droplets, and the free ends of the output fibers are on the opposite side. The remote end of the input fiber is coupled to a light source such as an infra-red light emitting diode. The remote ends of each output fiber are coupled to separate photodetectors such as, for example, a photodiode responsive to infra-red radiation. The ink is substantially a dye dissolved in water and is transparent to infra-red light, thus reducing the problems of contamination usually associated with ink droplet sensors. The photodiodes are coupled to differential amplifiers so that the output of the amplifiers are measurements of the location of droplets relative to the bisector of the distance between the output fiber ends confronting their associated input fibers and the droplets passing therebetween. Amplifier outputs are used in servo loops to position subsequently generated droplets to the bisector location. By using one of these zero crossing signal detectors at a location between adjacent endmost droplets thrown from separate adjacent nozzles, the stitch point between these droplets can be controlled so that the segments of each line of droplets to be printed by each nozzle may be adjusted to prevent gaps or overprinting on the recording medium.

U.S. Pat. No. 4,309,711 to Teumer discloses a continuous stream-type ink jet device having an ink droplet guttering system incorporated into every other deflection electrode. The droplets from each nozzle pass through an electrostatic field produced by a pair of deflection electrodes. One deflection electrode in each pair is grounded and is basically hollow with an opening in its trail edge or downstream edge. This trail edge confronts the recording medium so that ink droplets not to be printed are deflected by the electrostatic field into impact with the grounded deflection plate near its trail edge. The momentum of the ink droplet after impact carries the droplet around to the opening in the deflection plate where a light suction draws the ink into the hollow deflection electrode where it may be collected and returned to the ink supply for recirculation.

U.S. Pat. No. 4,347,521 to Teumer discloses a continuous stream type ink jet device having W-shaped or tilted pairs of deflection plates, one of which is grounded, and a separate guttering system that confronts the trail edge or downstream edge of the grounded deflection plates. The trail edge of the grounded deflection plate is tapered to provide clearance for the droplets to be guttered and to prevent impact thereon by the droplets.

U.S. Pat. No. 4,525,721 to Crean discloses a continuous stream type ink jet device which prints according to an interlace strategy. Each ink stream has a pair of deflection plates, one of which is grounded. Each grounded deflection plate contains an integral gutter.

Xerox Disclosure Journal, Vol. 9, No. 4, dated July/August 1984, to Lonis, discloses a continuous stream type ink jet device having a movable gutter which is repositionable between a location to interrupt the ink streams immediately downstream from the nozzles and prior to the charging electrodes and a location out of the paths of the ink streams.

SUMMARY OF THE INVENTION

It is the object of this invention to provide a nonfoaming, nonclogging, and mist-free gutter for use in a pagewidth, continuous stream ink jet printer.

It is another object of the invention to provide a gutter which minimizes the space between the stitch sensors and the gutter.

It is still another object of the invention to minimize the charge level necessary to gutter a droplet.

In the present invention, a narrow width contoured gutter is positioned in the ink jet printhead between the droplet stitch sensors and the trail edge of predetermined, generally grounded, deflection electrodes. Each gutter receives the non-printing droplets from two adjacent nozzles. The combination of gutter location and gutter shape minimizes the envelope size of the gutters and allows the gutters to be placed closer to the surface of the recording medium, such as paper, thus lowering the charge amplifier voltage requirements. Because the gutters are detached and slightly spaced downstream of the trail edge of the deflection plates, ink misting and buildup at the gutter entrance, if it should occur, are less likely to short the deflection electrodes. The gutter entrance is approximately shaped as a rectangular horseshoe and extends above the deflection plane of the sweep of droplets to be printed. The entrance is substantially perpendicular to the droplet deflection plane and is open at the bottom to allow ink to drain readily through an open channel, avoiding clogs and ink backup which plagues many prior art designs. The width of the side walls of the gutter projections narrow from their front openings towards their back portions, where they interface with a common manifold. The gutter entrances have essentially a triangular shape as viewed from the side because the angle of impact of the droplets on the interior back surface of each gutter must be less than 40 degrees. Larger impact angles produce turbulence of the ink around the gutter entrance which leads to misting. In the plan or top view, the gutter has an hour glass shape to prevent the adjacent endmost droplets from adjacent nozzles, which must pass closely thereby in their flight by the stitch sensors on their way to adjacent pixel targets on the recording medium, from striking the exterior gutter sidewalls after the droplets pass the gutter entrance. The gutter shape widens towards the interface of the back portion of the gutter entrance with the common manifold, so that the ink droplets are collected and readily drained from the protruding gutter entrance into the manifold, whereat the ink, with the assistance of gravity, is drained towards a sloping floor at the bottom of the manifold and into a conduit for circulation back to the main ink supply. In order to maintain a relatively uniform cross-sectional wall thickness of about four milinches (mils), or 100 microns, the gutter is fabricated by electroforming it on a mandrel or other metal forming techniques well known to the industry.

A complete understanding of the present invention can be obtained by considering the following detailed description in conjunction with the accompanying drawings.

DESCRIPTION OF THE PREFERRED EMBODIMENT

Figure 1:
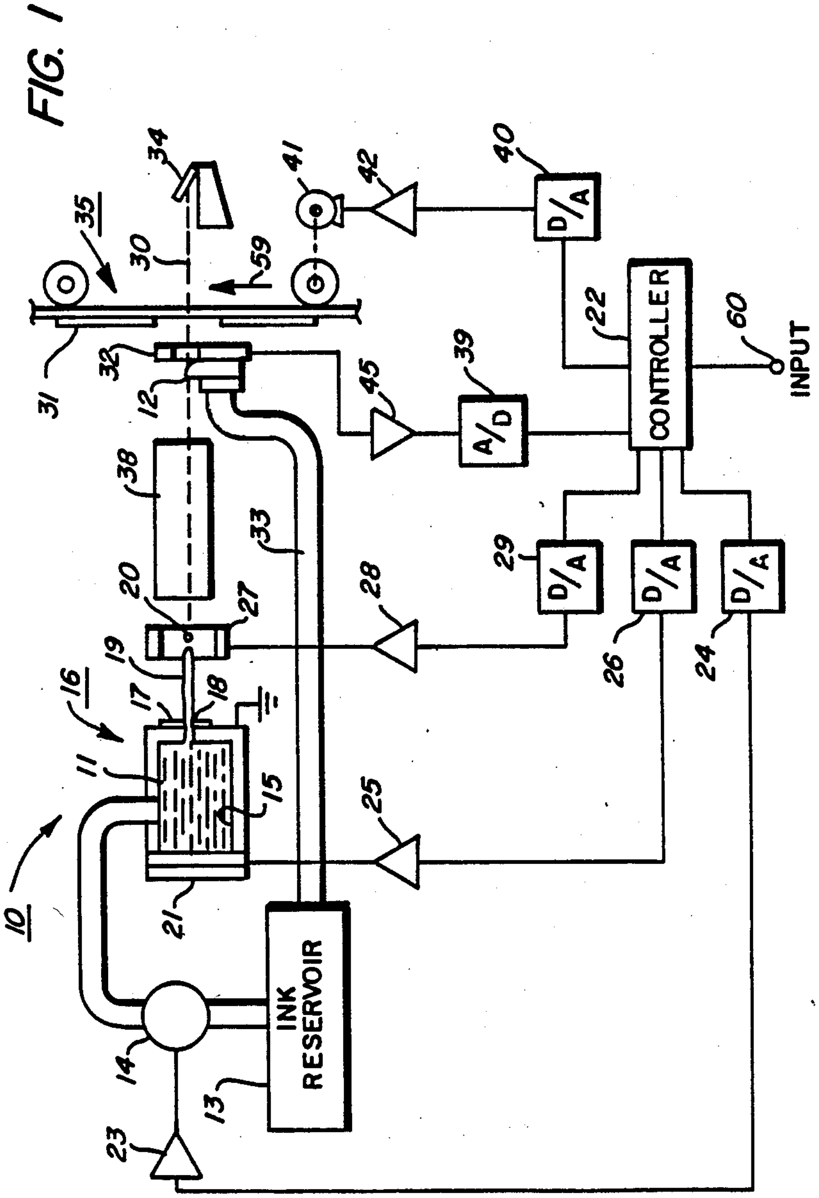
FIG. 1 is an elevation view in a schematic form of a continuous stream-type pagewidth printer having the ink droplet collecting gutters of the present invention.

Referring to FIG. 1, a continuous stream ink jet printer is depicted employing the narrow width, contoured shape gutter assembly 12 of the present invention. Fluid ink 11 is contained in reservoir 13 and is moved by pump 14 into the manifold 15 of ink drop generator 16. The drop generator has a nozzle plate 17 with a plurality of nozzles 18, each of which emit a continuous stream of ink 19. Droplets 20 are formed from the stream at a finite distance from the nozzle due to regular pressure variations imparted to the ink in the manifold by a piezoelectric device 21. The piezoelectric device is driven at a frequency in the range of 100 to 250 kHz which gives rise to a stream of droplets 20 that are generated at a frequency equal to that of the piezoelectric device. The pressure of the ink in the manifold is controlled by the pump 14 and establishes the velocity of the droplets 20. The pressure variations introduced by the piezoelectric device 21 are small but are adequate to establish the rate of droplet generation. Both the velocity and droplet frequency are under the control of a microcomputer or controller 22. Droplet velocity is controlled by regulating the pump to appropriately increase or decrease the ink pressure in the manifold 15. The controller communicates with the pump 14 via amplifier 23 and digital to analog (D/A) converter 24. The controller communicates with the piezoelectric device by means of amplifier 25 and D/A converter 26.

A charging electrode 27 for each nozzle is located at the position where droplets 20 are formed from streams 19. The charge electrodes are also under the control of the microprocessor or controller 22. The charge electrodes 27 are coupled to the controller by means of an amplifier 28 and D/A converter 29. The function of the charging electrodes is to impart a negative, positive, or neutral charge to droplets 20. The fluid ink is conductive and is electrically coupled to ground through the manifold 15. When a voltage is applied to the electrode 27 by the controller, at the instant of droplet formation, the droplet assumes a charge corresponding to the voltage applied to the electrode. In the embodiment illustrated in FIGS. 1 and 2, uncharged droplets follow an undeflected flight path 30 to the recording medium 31. Charged droplets are deflected left and right of path 30 in a plane perpendicular to the surface of FIG. 1, depending on the sign of the charge. Predetermined values of positive and negative charge for a droplet 20 will cause it to follow a path that directs it into a gutter 12 located to the right or left of centerline paths 30. The ink collected in gutter 30 is returned to the reservoir 13 via conduit 33. Since FIG. 1 is a side view, only one column is seen in that Figure, but it should be understood that a series of nozzles extend along the manifold to generate a series of parallel ink columns.

Droplets which are either uncharged or charged to a level insufficient to cause their trajectory to lead to gutter 12 are directed past a drop sensor 32 to recording medium 31. The drop sensor 32 is used to sense passage of ink droplets towards the recording medium and modify printer operation to insure that ink droplets from the plurality of ink streams are properly positioned on the recording medium. When a stitched system is utilized, as in the preferred embodiment, the drop sensor 32 insures that the ink droplets are properly stitched together to allow each incremental region, depicted as length X in FIG. 2, on the recording medium to be accessed by the droplets from one of the droplet generator nozzles.

Figure 2:
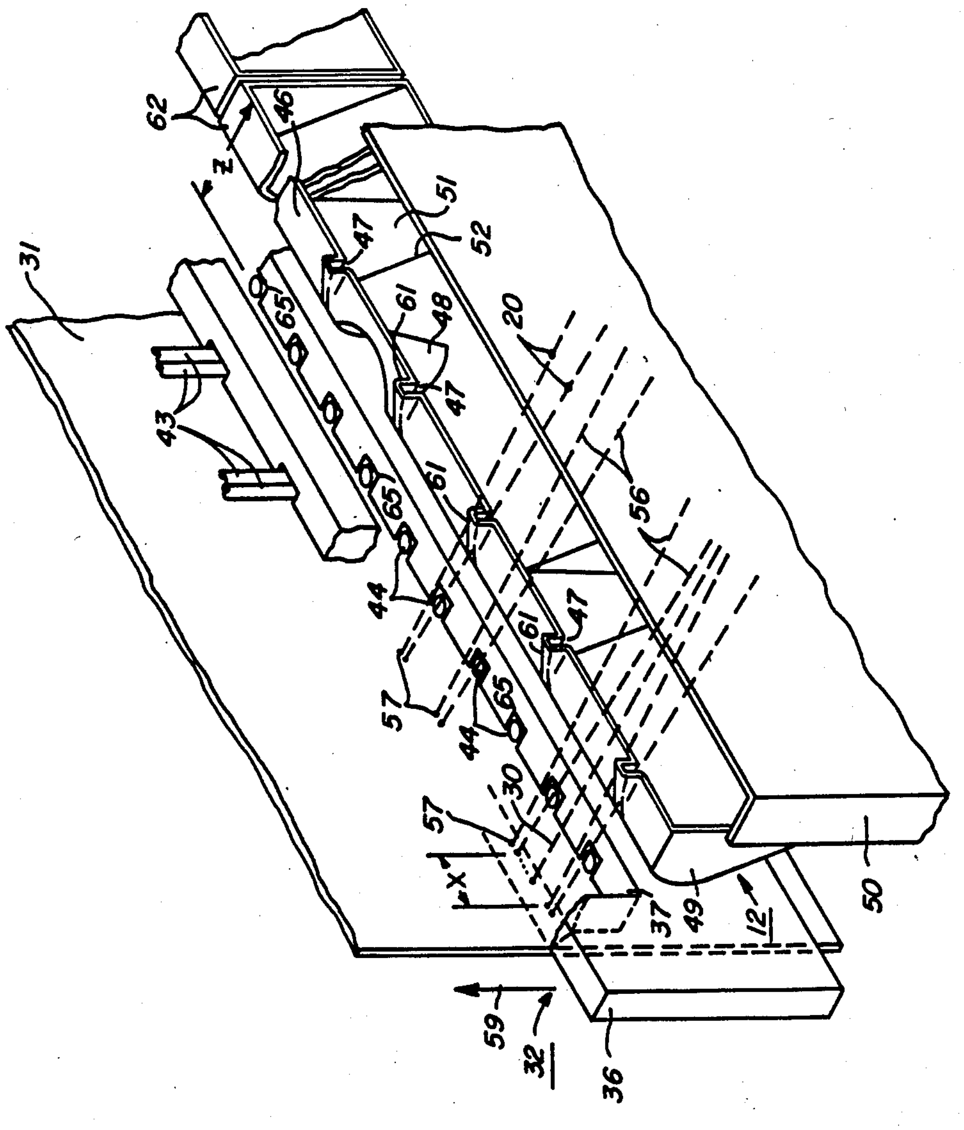
FIG. 2 is an isometric view of a portion of the gutters of FIG. 1.

Referring to FIG. 2, the stitch point droplets have trajectories adjacent the droplets targetted for the gutter 12. The closer the trajectories of the gutter droplets are to the stitch point trajectories, the lower the charge magnitudes are for the gutter droplets. Three benefits accrue from this configuration: (1) the maximum voltage output of the charge amplifier 28 is minimized, reducing power demand and cost; (2) the charge induced on several successive droplets during charging in the charge electrode 27 is reduced thereby reducing sensitivity to variations in the charge induction coefficient and consequently improving print quality; and (3) the forces induced on neighboring printing droplets in flight is reduced, consequently giving the printing system designer the freedom to widen the print channel (length X) without deleteriously affecting print quality. Thus, the number of jets or streams 19 necessary to print a given width recording medium 31 is reduced with consequent cost savings. By locating the gutter entrances 47 at predetermined positions to the sensors of the droplet sensor 32, and by shaping the gutter projections 61 to enable stitch droplets to pass closely thereby, the charge level necessary to gutter a droplet over that charge level required to deflect a printing droplet to the stitch point position is minimized and the above benefits are achieved.

An example of the use and application of a typical drop sensor 32 is disclosed in U.S. Pat. No. 4,255,754 to Crean et al entitled "Fiber Optic Sensing Method and Apparatus for Ink Jet Recorders", which has been assigned to the assignee of the present invention. The Crean patent is herein expressly incorporated by reference.

A second gutter 34 for recirculating ink droplets is used to intercept droplets generated while calibrating the system with the aid of the drop sensor 32. One application to which the present invention has particular applicability is a high speed ink jet device wherein successive sheets of recording medium or paper 31 are transmitted past the ink jet printhead and encoded with information. Experience has indicated that it is desirable to recalibrate the printer at periodic intervals to insure that the droplets 20 are directed to desired regions on the recording member 31. To accomplish this calibration, ink droplets are generated and caused to travel past the sensors 32 when no recording member 31 is in position to receive those droplets. In the calibrate mode of operation, it is therefore necessary that a gutter 34 be positioned to intercept droplets which would otherwise strike the recording medium. A transport mechanism 35 is also shown in FIG. 1. The transport 35 is used to move individual sheets of recording medium such as paper 31 past the droplet steams 56, better shown in FIG. 2, at a controlled rate of speed. Since the present printer is a high speed device, a mechanism must be included in the transport 35 for delivering paper to the transport and for stripping paper away from the transport once it has been encoded by the printer 10. These features of the transport 35 have not been illustrated in FIG. 1, since it is not related to the gutters which are the subject of the present invention.

The stitch sensors described in the Crean et al patent referred to above, are mounted on a sensor support board 36. The support board has an aperture 37 that permits the droplets 20 emitted by the nozzles to pass therethrough and either be collected by the gutter 34 during calibration or printed on the recording medium 31. A charged droplet is deflected due to the electrostatic field between deflection electrodes 38 associated with each nozzle. The deflection electrodes 38 have very high voltages coupled to them to create the deflection fields. The potential difference between the voltages is generally in the magnitude of 1,000 to 3,000 volts. The magnitude of the voltage applied to the charging electrode 27 is generally in the range of ±200 volts.

Ink droplet generation, charging, and recording medium transport are all controlled by the controller 22 which interfaces with the various components of the printer 10 by digital-to-analog and analog-to-digital converters. The controller comprises an input 60 for receiving a sequence of digital signals representative of desired voltages to be applied to the charging electrodes 27. The controller then generates multi-bit digital signals representative of desired charging voltages. As stated above, digital-to-analog converter 29 converts the digital signals representative of the desired charging voltage to an analog signal which is coupled to a power amplifier 28, which in turn energizes the charging electrode 27.

In addition to generating the charging voltage for the plurality of charging electrodes 27, the controller 22 receives inputs from the sensor 32 via an analog-to-digital converter 39, controls the speed of movement of the recording medium 31 via a second digital-to-analog converter 40 which drives motor 41, controls perturbation of the ink jet droplet generator 16 by the source of excitation 21 through a third digital-to-analog converter 26, and controls the pressure maintained inside the drop generator by pump 14 with a fourth digital-to-analog converter 24. As disclosed in the U.S. Patent to Crean et al, sensor 32 uses a pair of photodetectors to sense ink droplets, one each for two output fibers that are used to generate an electrical zero crossing signal. The zero crossing signal is used to indicate alignment or misalignment of a droplet relative to a bisector of a distance between the two output fibers. The sensor of this patent employs one input optical fiber with each two output optical fibers for each stitch point. The free ends of the fibers are spaced a small distance from each other; the free end of the input fiber is on one side of the flight path of the droplets and the free end of the output fibers are on the opposite side. The remote end of the input fibers is coupled to a light source (not shown), such as an infra-red light emitting diode (LED). The remote ends of each output fiber are coupled to separate photodetectors (not shown), such as for example, a photodiode responsive to infra-red radiation. The ink is substantially a dye dissolved in water and is transparent to infra-red light, thus reducing the problems of contamination usually associated with ink droplet sensors. The photodiodes are coupled to differential amplifiers (not shown), so that the output of the amplifiers are measurements of the location of droplets relative to the bisector of the distance between the output fiber ends confronting their associated input fibers and droplets passing therebetween. The amplifier outputs are coupled to a comparator 45 which in turn is coupled to the controller 22 via analog-to-digital converter 39 and used in servo loops to position subsequently generated droplets to the bisector location. By using one of the zero crossing signal detectors at a location between adjacent endmost droplets thrown from separate adjacent nozzles, the stitch point between these nozzles can be controlled so that the segments X of each line of droplets to be printed by each nozzle (see FIGS. 2 and 5) may be adjusted to prevent gaps or overprinting on the recording medium 31.

Figure 4:
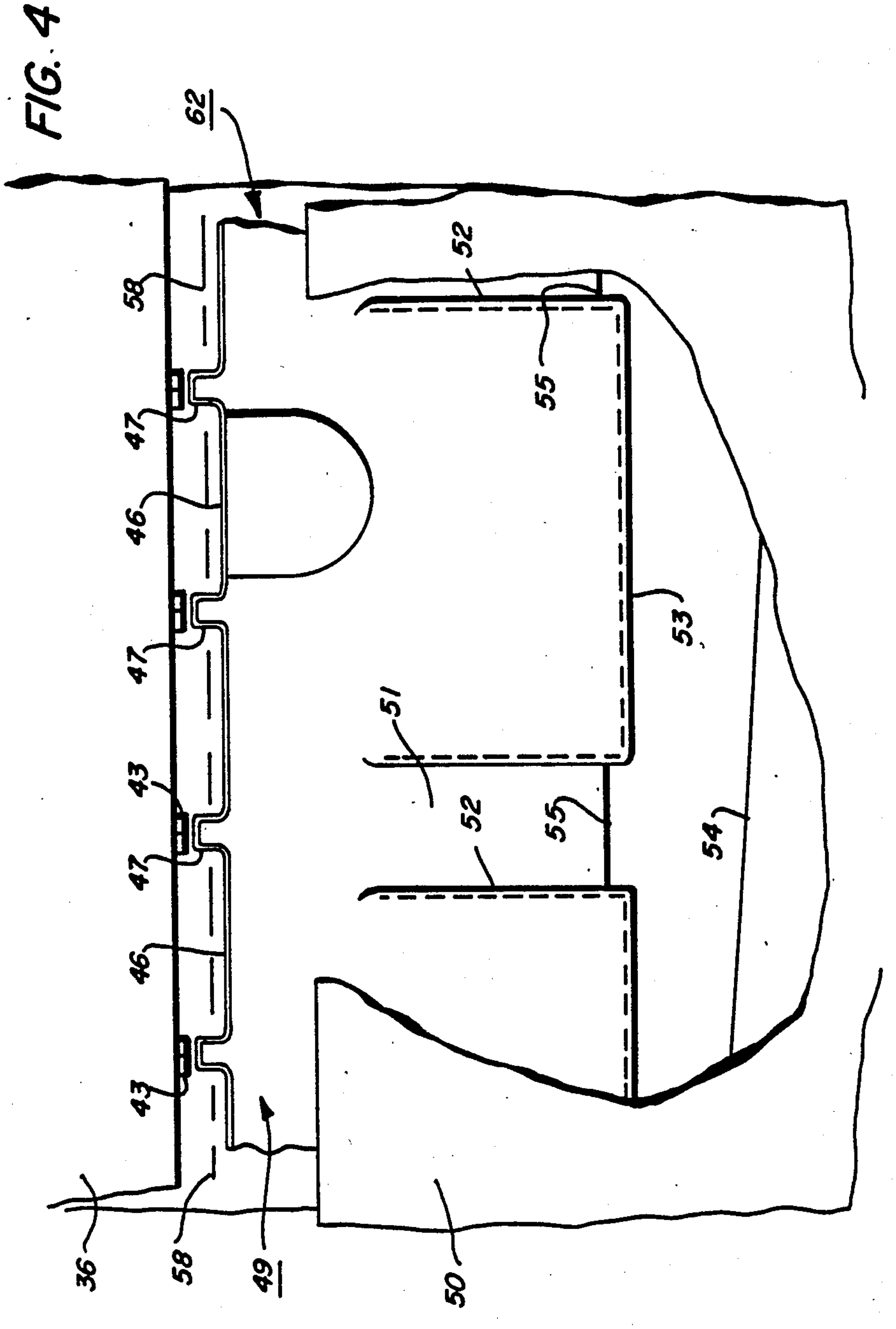
FIG. 4 is a front view of a portion of the gutters shown in FIG. 2 with a portion of the gutter manifold removed.

In FIG. 2, an isometric view of a portion of the gutter assembly 12 of the present invention is shown attached to the droplet sensor 32. The entrance 47 of the narrow width, contoured, gutter projections 61 is substantially perpendicular to the trajectories of the ink droplets 56 and the plane containing those entrances are held within an accurate predetermined distance Z with respect to the centerlines of the input optical fibers 44. In the preferred embodiment, the distance Z is about $120\pm10$ mils or $3\pm\frac{1}{4}$ mm. Each nozzle emits droplets that are capable of printing segments X of about 4.2 mm long on the recording medium 31. The drop sensor assembly contains in sensor support board 36 an aperture 37 through which the ink droplets pass on their flight to the recording medium. Input optical fibers 44 and associated pairs of optical output fibers 43 are mounted in grooves 65 on the backside of the sensor support board, so that their confronting free ends may sense the the endmost droplets and control the stitching between the segments X between adjacent nozzles. The gutter assembly 12 is constructed out of a uniform conductive material such as nickel that is grounded. The thickness of the gutter assembly is essentially four mils or 100 microns thick having a flat surface 46 just below the trajectories of the droplets with the gutter entrances 47 protruding above the flat surface 46. Because of the relatively small wall thickness of the gutter assembly, it is broken into segments 62 having lengths approximately $2\frac{3}{4}$ inches long and abutted together end to end to provide pagewidth gutter coverage. Each segment 62 has one or more cylindrical stiffening depressions 48 in a curved back section 49 which in turn diverts the collected ink droplets downwardly past a slanted bottom section 53 towards a sloping bottom wall 54 (see FIGS. 4 and 6) of gutter support structure 50 which, with the aid of gravity, drains the ink towards conduit 33 for returning the collected ink to the ink reservoir 13. The slanted bottom portion 53 of each segment 62 has stiffening support ribs 52 in the form of depressions, the back wall 51 of which is essentially perpendicular to the gutter assembly flat surface 46. As shown in FIG. 4, the stiffening ribs 52 also provide a means for aligning and mounting the gutter segments 62 on pegs or posts 55 of the support structure 50. Support structure 50 has a sloping bottom wall 54 for draining the ink. The gutter entrances 47 are essentially rectangular-shaped when viewed from the front as shown in FIG. 4, and triangularly-shaped in the side cross-sectional view shown in FIG. 6. The back end of the gutter entrance 47 slightly widens as it melds into the curved back section 49, but has a smaller width than the entrance dimension of approximately 12 mils or 0.3 mm.

Figure 5:
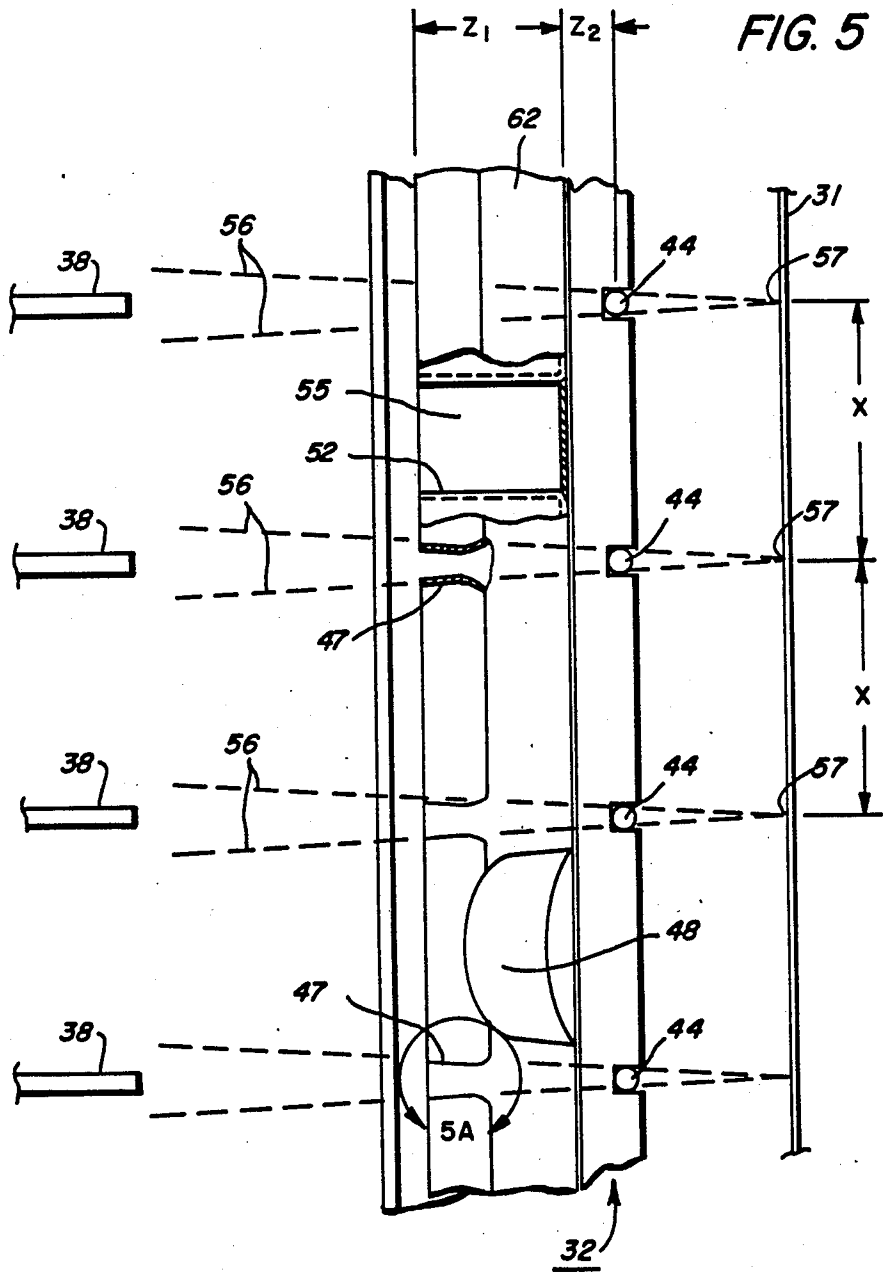
FIG. 5 is a top view of a portion of the gutters shown in FIG. 4.
Figure 5A:
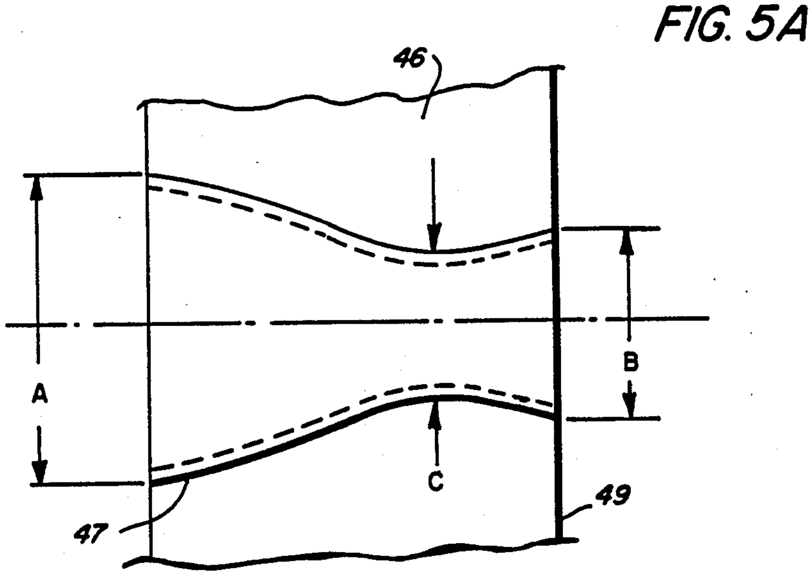
FIG. 5*a* is an enlarged top view of the single gutter entrance encircled in FIG. 5.

Referring to FIG. 5*a*, entrance width A is greater than the back dimensions B where the gutter entrance melds into the curved portion 49 at the interface of the curved portion and the gutter flat surface 46. Because the droplets from adjacent nozzles which are to print adjacent pixels on the recording medium, converge as they pass the gutter entrance, the shape of the gutter as viewed in FIG. 5 and 5*a* must be contoured in an hour glass manner, so that the width C of the gutter entrance in the plan view is smaller at an intermediate location between the entrance A and the back B of the gutter.

Figure 3:
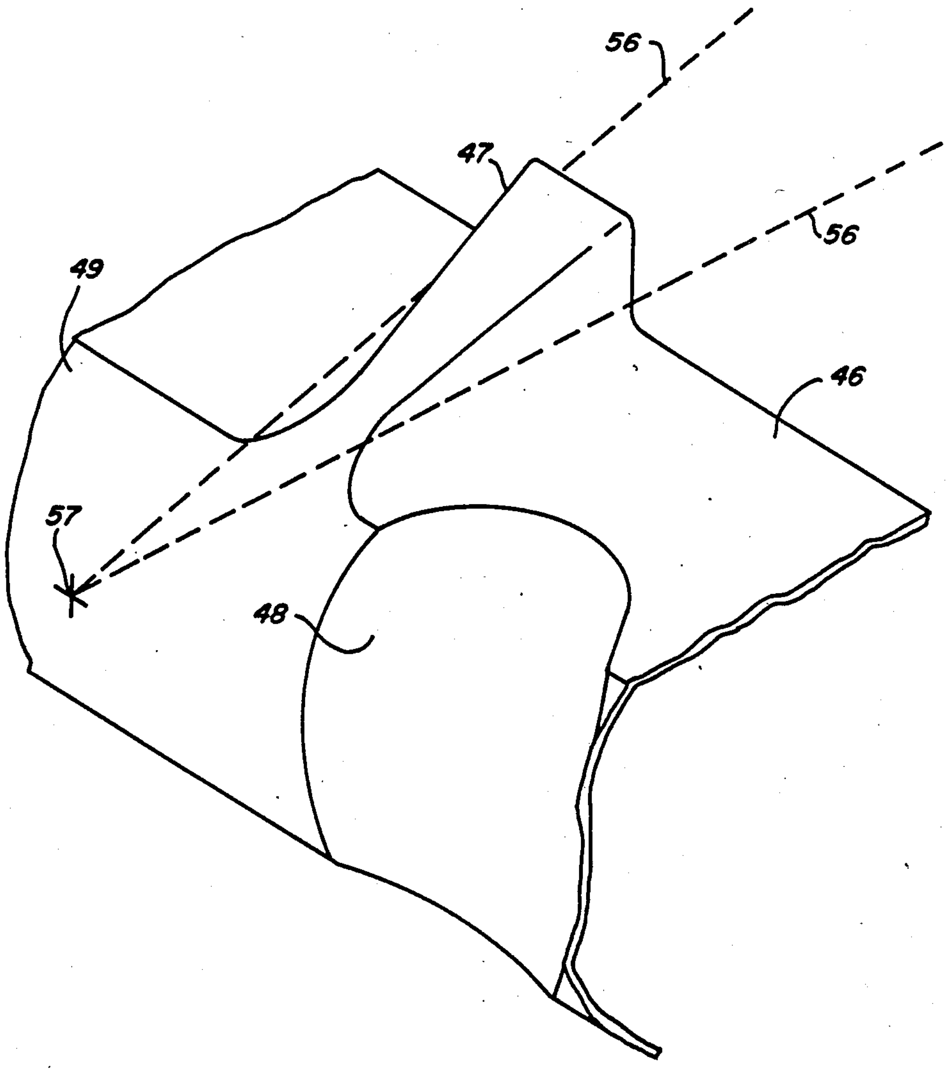
FIG. 3 is an isometric view of an enlarged single gutter as viewed from the recording medium.

Referring to FIG. 3, an isometric view of a single protruding gutter entrance 47 is shown enlarged as viewed from the recording medium (not shown). The droplet trajectories 56 of the endmost droplets from adjacent separate nozzles are shown converging towards stitched point 57. The hour glass like configuration of the protruding gutter entrance 47 is clearly shown as well as the cylindrical stiffening depression 48.

FIG. 4 shows a front view of a gutter segment 62 with a portion of the gutter support structure 50 removed to show the sloping bottom wall 54 and the posts 55 on which the gutter support ribs 52 are aligned and mounted. Each gutter segment 62 has at least two support ribs. The ink deflecting planes 58 are shown in dashed line substantially parallel to the flat surface of the gutter assembly. In reality, these ink deflection planes are slightly inclined as taught by U.S. Pat. No. 4,347,521 to Teumer. Output fibers 43 are shown essentially above the gutter entrances. A cylindrical stiffening depression 48 is generally located between the stiffening support ribs 52. Thus, it can be appreciated that the droplets directed to the pixel targets on the recording medium at a stitch point 57 behind the gutter entrances 47 must be contoured in an hour glass manner to permit passage of the droplets 20 without interfering with their trajectory.

FIG. 5 is a top view of a portion of a gutter segment 62 and a portion of the stitch sensor 32 showing the input fibers 44. In this view, the input optical fibers are shown with the droplet trajectories 56 printing the stitch points 57 between segments X. One gutter entrance 47 is used for each two nozzles with a stitch sensor required for each stitch point. One of the gutter entrances is shown in cross section to emphasize the hour glass contoured shape.

Figure 6:
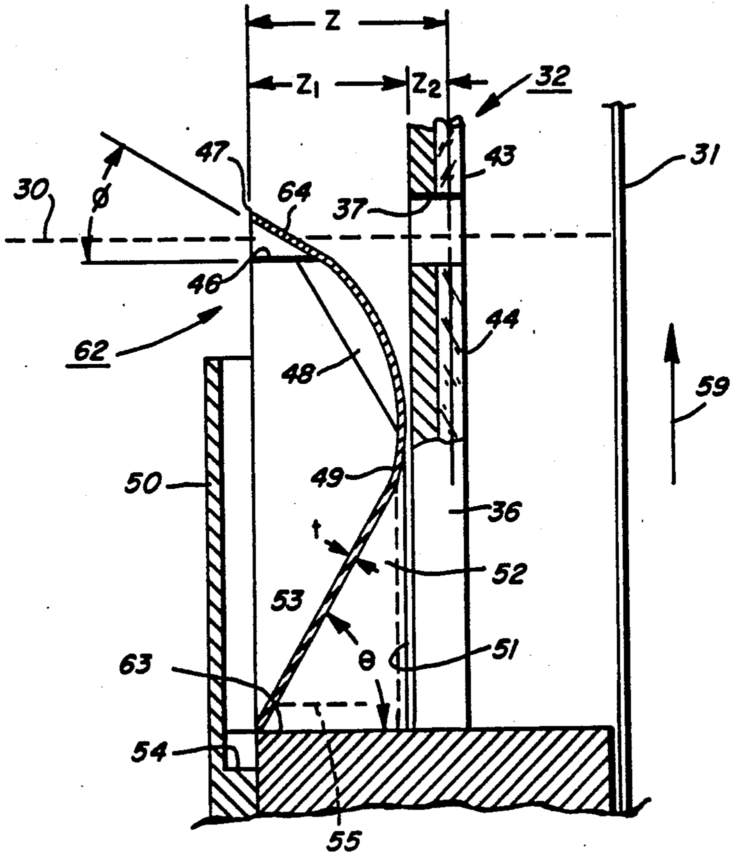
FIG. 6 is an enlarged cross-sectional side view of the gutters.

FIG. 6 is a cross-sectional side view of the gutter segment 62 and droplet sensor assembly 32. Droplet trajectory 30 of an uncharged droplet is shown in dashed line passing by the gutter entrance 47, through the aperture 37 of the sensor support board 36, and striking the recording medium 31. This view is particularly helpful in showing the several features needed for successful and reliable guttering. By successful guttering it is meant that the droplets are collected without the generation of mist, without turbulent guttering which could cause foaming of the ink, and without clogging. Since the droplet collecting projection of the gutter entrance has a slanted back wall 64 for the droplets to impact, an open bottom, and a smoothly curving section 49 to divert the captured ink droplets downwardly, assisted by the affect of gravity, the ink droplets are successfully and readily guttered. The maximum curvature of section 49 depends upon the ink droplet velocity and in high speed, high resolution ink jet printers, this velocity is in the range of 30 meters per second. For this velocity of ink droplets, a curvature radius smaller than 20 or 30 mils (0.5 or 0.75 mm) will cause the ink to foam, thus allowing some of the ink to spill out of the entrance of the gutter. The angle of the impact of the ink droplet on the internal surface of the gutter back wall 64 is depicted as the angle $\Phi$ which is 30 degrees or less. The cross-sectional thickness of the gutter segment 62 is depicted as $Z_1$ and the distance from the front of the sensor support board to the centerline of the input and output optical fibers is depicted as $Z_2$. $Z_1$ and $Z_2$ are both about 60 mils or 1.5 mm. The combination of these two distances is shown as Z. The sloping surface of the bottom of the gutter assembly 53 is at an angle $\theta$ with respect to the machine frame reference plane surface 63 which is parallel to the flat surface 46 of the gutter segment. The angle $\theta$ is about 60 to 75 degrees.

The gutter collecting surface should support uninterrupted flow of the ink away from the impact region 64 of the gutter. A smooth wettable surface accommodates this criterion. Surface roughness should not exceed several micro-inches or tenths of microns in the gutter entrance. The exterior surface of the gutter should be as smooth and wettable to alleviate accumulation of ink caused by occasional errant drops. The back portion of the gutter entrance best performs as a drain channel when it has a widened or flared cross sectional area near the melding intersection with the curved back portion 49 of the gutter segment to accommodate the buildup of ink as it flows loses speed as it drains downwardly. The ink flow down a gutter of constant channel cross section causes ink buildup that can exceed the gutter dimensions. Such ink buildup may amount roughly to twice the gutter draining cross-sectional area. The shape of the back portion of the gutter entrance 47 is flared at the interface with the flat surface 46 of the gutter segment 62. Even though the back wall 64 of the gutter entrance is sloping downward, it flares into the main open curved portion 49 of the gutter segment and, thus, always provides more than enough volume to accommodate the ink buildup as it slows in its progress towards the slanted bottom section 53 of the gutter segment. In this way, the volume of the ink droplet in the capture region is maximized. Another important feature of this guttering system is that the impact area is sloped and smoothly contoured to the open curved portion 49 of the gutter segment to promote non-clogging flow of the ink. The predetermined angle $\theta$ for the slanted bottom section 53 of the gutter segment efficiently and effectively guides the collected ink into the gutter support structure 50 and onto the sloping surface 54 which then drains the collected ink to an opening (not shown) connected with conduit 33 for directing the ink back to the ink reservoir 13.

Many modifications and variations are apparent from the foregoing description of the invention and all such modifications and variations are intended to be within the scope of the present invention.

We claim:

1. An ink jet gutter assembly for a continuous multiple stream, pagewidth ink jet printer having an array of optical stitch sensors mounted in a frame member and spaced a predetermined distance upstream from a moving recording medium, the stitch sensors having light emitting input fibers with faces substantially in a plane perpendicular to the recording medium, each input fiber face having a center, ink droplets emitted from nozzles of a droplet generator of the printer are directed along trajectories to the recording medium to form images thereon one line of pixels at a time, the droplets not directed to the recording medium are diverted to the gutter assembly for collecting and reuse by the printer, the gutter assembly comprising:

at least one integral structure mounted upstream and adjacent the array of stitch sensors, the integral structure having a generally open concave shape with respect to the direction of droplet flight paths and having a flat surface portion with a plurality of equally spaced projections for collecting the gutter droplets, an arcuate portion, and a flat sloping portion;

the flat surface portion being below the trajectories of the droplets and substantially parallel to the stitch sensors and lineal printed segments by each nozzle;

the arcuate portion being intermediate the flat surface portion and the flat sloping portion with the flat sloping portion being furthest from the droplet trajectories; and the plurality of droplet collecting projections formed in the flat surface portion in a manner which cause them to extend upwardly out of the flat surface portion toward and above the droplet flight paths, each projection having an entrance substantially perpendicular to the flight direction of the droplets for receiving the droplets from two adjacent nozzles that are not to be printed, the projection having relatively narrowly spaced side walls and a back wall that slopes from the entrance with a predetermined angle with respect to the trajectories of the droplets entering therein, the width of the back wall at the projection entrance being wider than its opposite end portion that contours into the flat surface portion of the integral structure at the interface between the flat surface portion and the arcuate portion, so that the side walls are closer to each other near said intersection and in a side view each projection appears triangularly shaped, the back wall of the projection having a narower width at a location intermediate the entrance and the opposite end portion so that in plane view, it appears as an hour glass shape, this hour glass shape prevents interference with droplets from separate adjacent nozzles directed to the stitch point pixels on the recording medium.

2. The gutter assembly of claim 1 wherein entrance of the gutter projection has a rectangular horseshoe shape, and wherein the bottom of the projection is open to drain readily the ink droplets which enter the projection entrance, the open bottom of the projection avoiding clogs and ink backup from the projection.

3. The gutter assembly of claim 2, wherein the slope of the projection back wall is less than 40 degrees with respect to the ink droplet trajectories to prevent turbulence of the ink collected in the gutter projections which would cause ink misting.

4. The gutter assembly of claim 3, wherein the projection entrance is positioned upstream from the optical stitch sensors a predetermined distance from the input fiber centers of the stitch sensors.

5. The gutter assembly of claim 4, wherein the predetermined distance between the projection entrance and input fiber face centers is about 120±10 mils or $3\pm\frac{1}{4}$ mm.

6. The gutter assembly of claim 4, wherein the gutter assembly is an electrically conductive material and is substantially uniformly thick.

7. The gutter assembly of claim 6, wherein the gutter assembly thickness is about four mils or 100 microns, and wherein the gutter assembly material is nickel.

8. The gutter assembly of claim 3, wherein the gutter assembly further comprises a plurality of individual gutter assembly segments, abutted end-to-end for at least the width of the recording medium.

9. The gutter assembly of claim 8, wherein each segment has one or more stiffening depression in the arcuate portion thereof, the depression protruding into arcuate portion in a direction toward the ink jet printer.

10. The gutter assembly of claim 8, wherein the flat sloping portion has stiffening support ribs formed therein which provide a means for aligning and mounting of each segment on pegs of a support structure of the printer; and wherein the flat sloping portion has an angle of about 60 to 75 degrees with respect to a plane parallel with the flat surface portion.

* * * * *